United States Patent
Moidu

(10) Patent No.: US 9,645,333 B2
(45) Date of Patent: May 9, 2017

(54) OPTOMECHANICAL ASSEMBLY

(71) Applicant: Lumentum Operations LLC, Milpitas, CA (US)

(72) Inventor: Abdul Jaleel K. Moidu, Nepean (CA)

(73) Assignee: Lumentum Operations LLC, Milpitas, CA (US)

( * ) Notice: Subject to any disclaimer, the term of this patent is extended or adjusted under 35 U.S.C. 154(b) by 14 days.

(21) Appl. No.: 14/516,720

(22) Filed: Oct. 17, 2014

(65) Prior Publication Data

US 2016/0109669 A1  Apr. 21, 2016

(51) Int. Cl.
*G02B 6/42* (2006.01)
*G02B 6/26* (2006.01)
*G02B 6/293* (2006.01)

(52) U.S. Cl.
CPC ......... *G02B 6/4267* (2013.01); *G02B 6/4271* (2013.01); *G02B 6/4273* (2013.01); *G02B 6/29304* (2013.01); *G02B 6/29398* (2013.01)

(58) Field of Classification Search
CPC .. G02B 6/4266–6/4269; G02B 6/4271–6/4273; G02B 6/29398
See application file for complete search history.

(56) References Cited

U.S. PATENT DOCUMENTS

| | | | |
|---|---|---|---|
| 3,662,150 A * | 5/1972 | Hartung | H05K 1/0212 219/209 |
| 4,399,541 A * | 8/1983 | Kovats | G02B 6/4202 372/12 |
| 4,404,459 A * | 9/1983 | Harton | H03L 1/04 219/209 |
| 5,011,247 A | 4/1991 | Boudreau et al. | 385/33 |
| 5,919,383 A * | 7/1999 | Beguin | G02B 6/4201 219/209 |
| 6,227,724 B1 | 5/2001 | Verdiell | 385/91 |
| 6,252,726 B1 | 6/2001 | Verdiell | 359/820 |
| 6,486,440 B1 | 11/2002 | Crafts et al. | 219/209 |
| 6,528,329 B2 | 3/2003 | Goudard | 438/5 |
| 6,583,388 B2 | 6/2003 | Crafts et al. | 219/209 |
| 6,664,511 B2 | 12/2003 | Crafts et al. | 219/209 |
| 6,668,126 B2 * | 12/2003 | Knox | G02B 6/4453 385/123 |
| 6,771,437 B1 * | 8/2004 | Willis | G01M 11/04 359/811 |
| 6,773,532 B2 * | 8/2004 | Wolf | G02B 6/4277 156/182 |
| 6,788,870 B1 | 9/2004 | Maxham et al. | 385/135 |
| 6,825,997 B2 * | 11/2004 | Hubbard | G02B 7/008 359/819 |

(Continued)

FOREIGN PATENT DOCUMENTS

WO 03105294 12/2003 ............. H01S 5/024

*Primary Examiner* — Rhonda Peace
(74) *Attorney, Agent, or Firm* — Harrity & Harrity, LLP

(57) ABSTRACT

A dual enclosure including an inner housing inside an outer housing is provided for an optical bench supporting a plurality of optical elements. An air gap is provided between the inner and outer housings. The inner housing may act as a heat spreader for isothermal operation, and the outer housing may act as a heat insulator. The optical bench may be disposed within the inner housing on a supporting element or elements, which thermally and mechanically decouple the optical bench from the inner housing.

20 Claims, 3 Drawing Sheets

(56) References Cited

U.S. PATENT DOCUMENTS

| | | | |
|---|---|---|---|
| 6,931,038 B2* | 8/2005 | Mazed | H01S 5/0687 372/20 |
| 6,948,864 B2 | 9/2005 | Reilly et al. | 385/92 |
| 7,476,038 B2* | 1/2009 | Oikawa | G02B 7/008 385/92 |
| 7,962,044 B2 | 6/2011 | McCallion et al. | 398/192 |
| 8,036,502 B2* | 10/2011 | Duricic | G02B 6/3512 385/14 |
| 8,121,483 B2* | 2/2012 | Duricic | G02B 6/2931 398/164 |
| 8,353,634 B2* | 1/2013 | Tsai | G02B 6/12 362/368 |
| 8,530,990 B2 | 9/2013 | Linderman et al. | 257/433 |
| 9,063,305 B2* | 6/2015 | McColloch | H05K 7/20409 |
| 9,158,078 B2* | 10/2015 | Toyohara | H01S 5/02272 |
| 2004/0042742 A1* | 3/2004 | Bradshaw | G02B 6/4201 385/94 |
| 2004/0075733 A1 | 4/2004 | Nebosis | 347/261 |
| 2005/0078919 A1* | 4/2005 | Mori | G02B 6/12007 385/92 |
| 2008/0080806 A1 | 4/2008 | Ho et al. | 385/14 |
| 2013/0308898 A1* | 11/2013 | Doerr | G02B 6/428 385/14 |
| 2014/0063743 A1* | 3/2014 | Chan | G02B 6/428 361/712 |
| 2014/0241673 A1* | 8/2014 | Chan | G02B 6/4268 385/92 |
| 2014/0329405 A1* | 11/2014 | Hsieh | H05K 1/0209 439/485 |
| 2015/0016865 A1* | 1/2015 | Moidu | B32B 7/02 403/30 |
| 2015/0282303 A1* | 10/2015 | Hsieh | G02B 6/4272 359/811 |

\* cited by examiner

OPTOMECHANICAL ASSEMBLY

TECHNICAL FIELD

The embodiments described herein relate to optomechanical assemblies, and in particular to packaging of optical components into optomechanical assemblies.

BACKGROUND

Optical devices usually include optical elements held in a pre-determined spatial relationship by mechanical supports and holders. A mechanical package or housing may be provided to protect sensitive optical elements from dust, shock, vibration, and other unwanted influences of the outside environment. However, some packages may create thermal gradients, which in turn may disrupt precision-aligned wavelength-dispersed optical beams, cause mechanical stresses that may result in a shift of wavelength dispersion of the diffraction grating, and influence wavelength channel position. In view of the foregoing, it may be understood that there may be significant problems and shortcomings associated with current solutions and technologies for packaging of optical components into optomechanical assemblies.

SUMMARY

A dual enclosure for an optical bench is provided. The optical bench may hold various optical elements in an aligned state. The dual enclosure may include an inner housing and an outer housing. The inner housing is placed inside the outer housing, with a gap e.g. an air gap between the inner and outer housings. The inner housing may function as a heat spreader, and the outer housing may function as a heat insulator. The optical bench may be thermally and mechanically decoupled from the inner housing by providing suitable soft, thermally insulative support(s). The supports may be much softer than the optical bench, absorbing residual external stresses. The optical components may be thermally matched to the optical bench for further reduction of internal mechanical stresses.

In accordance with one embodiment, there is provided an optomechanical assembly comprising:
  an optical bench;
  a plurality of optical components supported by the optical bench;
  an inner heat spreader housing defining a first inner wall and a first cavity, the inner housing having a heat conductivity of at least 50 W/m·K;
  a support element mechanically coupled to the inner housing, the support element supporting the optical bench in the first cavity spaced apart from the first inner wall, for decreasing a transfer of mechanical stress and heat from outside the first cavity to the optical bench;
  a thermal element thermally coupled to the inner housing for adjusting temperature thereof; and
  an outer heat insulator housing defining a second cavity and supporting the inner housing therein so that an air gap is provided in the second cavity between the inner and outer housings, the outer housing having a heat conductivity of no greater than 0.4 W/m·K.

In accordance with another embodiment, there is further provided a method of packaging an optical bench supporting a plurality of optical components, the method comprising:
  (a) providing an inner heat spreader housing having a heat conductivity of at least 50 W/m·K and defining a first inner wall and a first cavity;
  (b) supporting the optical bench within the first cavity spaced apart from the first inner wall by a support element for decreasing a mechanical stress and heat transfer to the optical bench;
  (c) thermally coupling a thermal element to the inner heat spreader housing for adjusting temperature thereof;
  (d) providing an outer heat insulator housing defining a second cavity; and
  (e) supporting the inner housing within the second cavity so that an air gap is provided in the second cavity between the outer and inner housings, the heat insulator having a heat conductivity of no greater than 0.4 W/m·K.

In one exemplary embodiment, the support element has an elastic modulus of less than 10 MPa and, optionally, a heat conductivity of no greater than 2 W/m·K. Furthermore in one embodiment, the plurality of optical components are thermally matched to the optical bench to within 2 ppm/° C., or more particularly to within 1 ppm/° C., and the optical bench has an elastic modulus of at least 70,000 MPa.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

As described above, a mechanical package or housing may be provided to protect sensitive optical elements from dust, shock, vibration, and other unwanted influences of the outside environment. Optical modules used in optical fiber communication networks are normally built to high environmental standards including a wide operating temperature range, high humidity, shock, vibration, etc. Given a precise alignment of optical elements required to couple light into optical fibers having a core of only a few micrometers in diameter, packaging optical telecommunications modules for a wide temperature range, high humidity, shock, and vibration may be a challenging and non-trivial matter.

During the last decade, a new class of optical communications modules has emerged for switching individual wavelength channels between different optical fibers in an optical network. The wavelength channels may be switched in arbitrary channel groups or individually, independently on each other. Such wavelength channel switching modules have been termed wavelength selective switch (WSS) modules. WSS modules include precision manufactured optical elements, such as diffraction gratings, microelectromechanical (MEMS) mirror arrays, liquid crystal arrays, etc. These optical elements may be disposed and aligned within the device package with micrometer accuracy. The required wavelength accuracy and stability of several picometers, and optical loss variation of less than 0.5 dB impose stringent requirement on optomechanical packaging of WSS modules.

Figure 1:
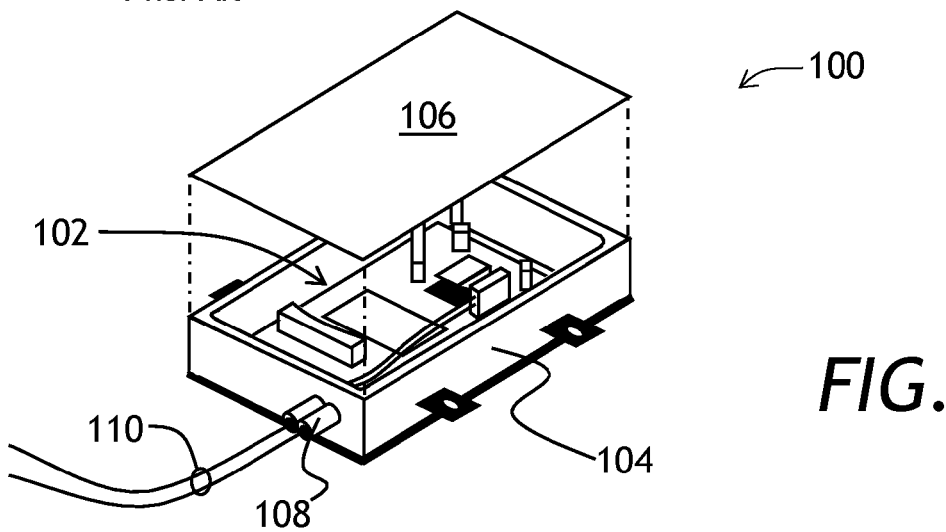
FIG. 1 illustrates an isometric view of a conventional WSS module.

Referring to FIG. 1, a WSS module 100 may include optical components 102 affixed within an enclosure 104 hermetically sealable with a lid 106 welded onto the enclosure 104. Cerrocasts 108 may be provided for feeding input/output optical fibers 110 through the enclosure 104. Temperature control may be one challenge faced by the WSS module 100. While heating or cooling elements may be coupled to the WSS module 100 (e.g., to various optical components 102 in the package 104), local heating and cooling may sometimes create thermal gradients. The thermal gradients may cause air flows between the optical elements 102, perturbing precision-aligned wavelength-dispersed optical beams. Furthermore, mechanical stresses may appear as a result of thermal gradients. Mechanical stresses may result in a shift of wavelength dispersion of the diffraction grating, and may influence wavelength channel position. Yet another issue is lack of adequate thermal insulation of the metal packages from the ambient, raising heating/cooling power dissipation, even when the heating is localized.

Figure 2A:
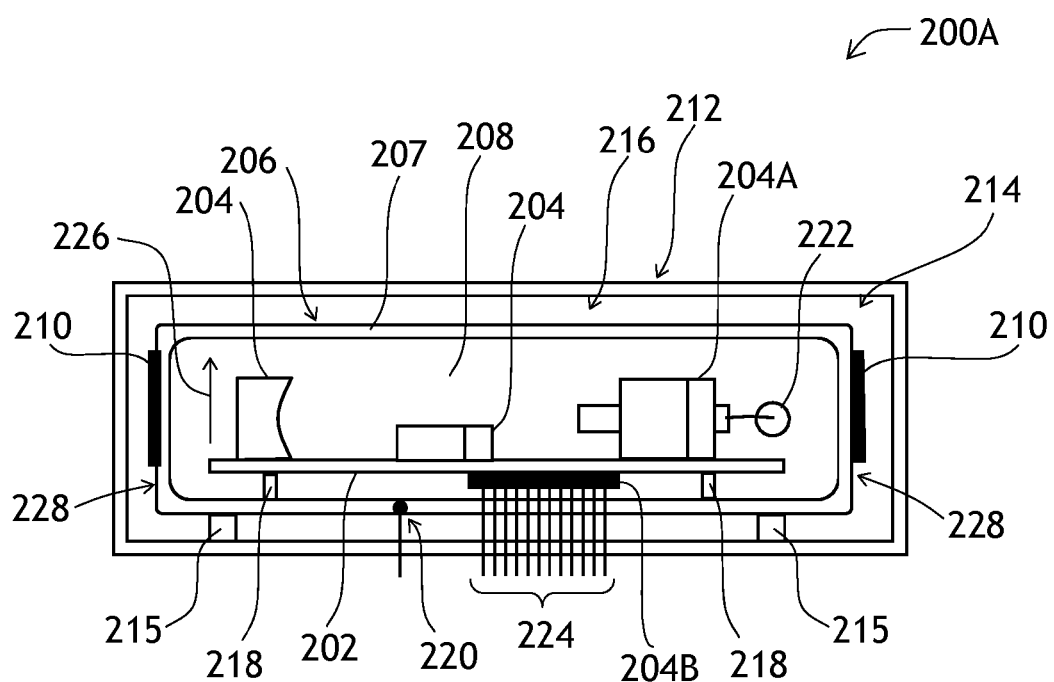
FIGS. 2A and 2B illustrate side cross-sectional views of optomechanical assembly embodiments including a heater and a thermoelectric cooler (TEC), respectively.

Referring to FIG. 2A, an exemplary optomechanical assembly 200A (e.g., a WSS, a multicast optical switch, an optical router, etc.) is shown. The optomechanical assembly 200A may include an optical bench 202 and a plurality of optical components 204 including e.g. a diffraction grating 204A and a liquid crystal array 204B, supported by the optical bench 202. An inner heat spreader housing 206 defines a first inner wall 207 and a first cavity 208. The inner housing 206 may have a high heat conductivity of at least 50 W/m·K e.g. 100 W/m·K. Other variations may also be considered.

One or more support elements 218 may be mechanically coupled to the inner housing 206, supporting the optical bench 202 in the first cavity 208, such that the optical bench 202 is spaced apart from the first inner wall 207, for decreasing a transfer of mechanical stress and heat from outside the first cavity 208 to the optical bench 202. In the illustrated exemplary embodiment, a single support element 218 may be provided, e.g., a single annular support element 218, but a plurality of support elements 218 is also within the scope of the invention. A heater 210 may be thermally coupled to the inner housing 206 for adjusting the temperature of the inner housing 206 and the optical components 204 therein. A temperature sensor 220 may be thermally coupled to the inner housing 206 for determining temperature of the inner housing 206.

The higher the heat conductivity of the inner housing 206, the more uniform the temperature distribution may be within the first cavity 208 containing the optical bench 202 and the plurality of optical components 204, 204A, 204B. As a result, mechanical stresses within the plurality of optical components 204, 204A, 204B caused by differences in coefficients of thermal expansion, and air convection within the first cavity 208 may be reduced. The support element(s) 218 may have a heat conductivity of no greater than 2 W/m·K. In some embodiments, the support element(s) 218 may have a heat conductivity less than 1 W/m·K, and an elastic modulus of less than 10 MPa. It should be appreciated that the relative low heat conductivity may reduce and help ensure uniformity of heat transfer from the inner housing 206 to the optical bench 202, resulting in a more even heating. In some embodiments, the elasticity requirement of the material of the support element(s) 218 may be a primary requirement, and a low thermal conductivity of the support element(s) 218 may be a secondary requirement. In other words, a main function of the support element(s) 218 may be to provide a soft support for the optical bench 202 to reduce the mechanical stress, and to also act as a thermal insulator or a poor conductor, to avoid hot or cold spots on the optical bench 202. By way of a non-limiting example, the support element(s) 218 may include such materials as Viton™ rubber, Urethane™ rubber or thermo-plastic elastomers, etc.

Low mechanical hardness of the support element(s) 218 may facilitate dampening of external mechanical stresses, while the structural rigidity of the optical bench 202 may keep the optical elements 204, 204A, 204B aligned in a predetermined spaced apart relationship. By way of a non-limiting example, the optical bench 202 may have an elastic modulus in the range of 70,000 MPa to 320,000 MPa for optical bench 202 materials; e.g. 141,000 MPa±100 MPa for metal optical benches 202 such as Invar optical benches 202. It may also be helpful to have the plurality of optical components 204, 204A, and/or 204B thermally matched, e.g. similar coefficients of thermal expansion e.g. between 1 ppm/° C. to 2 ppm/° C., to the optical bench 202. The thermal matching may reduce mechanical stresses, facilitating a stable and reliable optical performance of the optomechanical assembly 200A. By way of an illustrative example, the optical bench 202 may be made of Invar™ or Kovar™, and the optical components 204 including the diffraction grating 204A, and/or the liquid crystal array 204B may be made of a low thermal expansion glass e.g. N-BK7 for Kovar optical bench 202, and/or fused silica for Invar optical bench 202. In one embodiment, the liquid crystal array 204B may include a liquid crystal-on-silicon (LCoS) array. It should be appreciated that silicon has a thermal coefficient of expansion (TCE) of 2.5 ppm/° C., that is between that of Invar (1.3 ppm/° C.) and Kovar (5.8 ppm/° C.).

An outer heat insulator housing 212 may define a second cavity 214. The outer housing 212 may support the inner housing 206 inside the second cavity 214 of the outer housing 212 by one or more leg(s) or standoff(s) 215 or similar supporting element(s), such that an air gap 216 is provided in the second cavity 214 between the inner 206 and outer 212 housings. In one embodiment, the air gap 216 may be at least 0.5 mm. In some embodiments, the air gap 216 may be at least 1 mm thick. It should be appreciated that while a thicker air gap 216 may be advantageous, such an insulation air gap 216 may result in a trade off against optics height and module height requirements.

To act as a thermal barrier, the outer housing 212 may have a heat conductivity of less than that of the inner housing 206, e.g. of no greater than 0.4 W/m·K and no greater than 0.2 W/m·K. This may reduce the heat dissipation to the outside environment, allowing the heater 210 to heat the inner housing 206 more efficiently and uniformly. The optomechanical assembly 200A may also have a plurality of optical 222 and electrical 224 ports extending through the first inner wall 207 of the inner housing 206 and the second cavity 214.

The thermally insulative outer housing 212 in combination with the thermally conductive inner housing 206 separated by the air gap 216, supporting the rigid optical bench 202 in the first cavity 208 by thermally insulative, soft support element(s) 218 may provide a layered protection of the optical bench 202 and the optical elements 204, 204A, and 204B against external mechanical stresses and temperature variations, while enabling the temperature of the optical elements 204, 204A, and 204B to be precisely controlled. When the temperature of the liquid crystal array 204B is to be maintained at a constant level for an optimal operation, as is typically the case, the temperature of the entire optical bench 202 supporting the optical elements 204, 204A, and 204B may be uniformly maintained at that level. Furthermore, the conductive inner housing 206 may be hermetically sealed, while providing the optical 222 and electrical 224 ports extending through the hermetically sealed inner housing 206 for communication with outside equipment. For high thermal conductivity, the inner housing 206 may include aluminum or copper. The outer housing 212 may be inexpensively manufactured out of a plastic material such as Ultem™ e.g. by injection molding. For example, the outer housing 212 may be injection-molded with the legs 215 formed integrally with the outer housing 212. The outer housing 212 may be made of a two-piece clamshell assembly or an extruded assembly with end caps etc. for ease of placing the inner housing 206 in this thermal insulation shell.

In an exemplary embodiment shown in FIG. 2A, the plurality of optical components 204, including the diffraction grating 204A, extend upwards from the optical bench 202 in a first direction 226. The liquid crystal array 204B may extend in an opposite direction, that is, downwards in FIG. 2A. The inner housing 206 has an outside perimeter wall 228 extending parallel to the first direction 226, and the heater 210 may extend along the outside perimeter wall 228. In other words, the heater 210 encircles, or surrounds, the inner housing 206, while leaving top and bottom of the inner housing 206 exposed. This enables a more uniform heating of the inner housing 206, while keeping low height of the optomechanical assembly 200A in the first direction 226, enabling stacking of circuit boards supporting individual optomechanical assemblies 200A in the first direction 226. The temperature sensor 220 may be sunk into the inner housing 206 from a side not occupied by the heater 210, e.g. the temperature sensor 220 may be sunk into a bottom wall of the inner housing 206 as shown in FIG. 2A. To save space, low-thickness heaters, e.g. Kapton™ thin-film heaters, may be used to construct the heater 210.

Figure 2B:
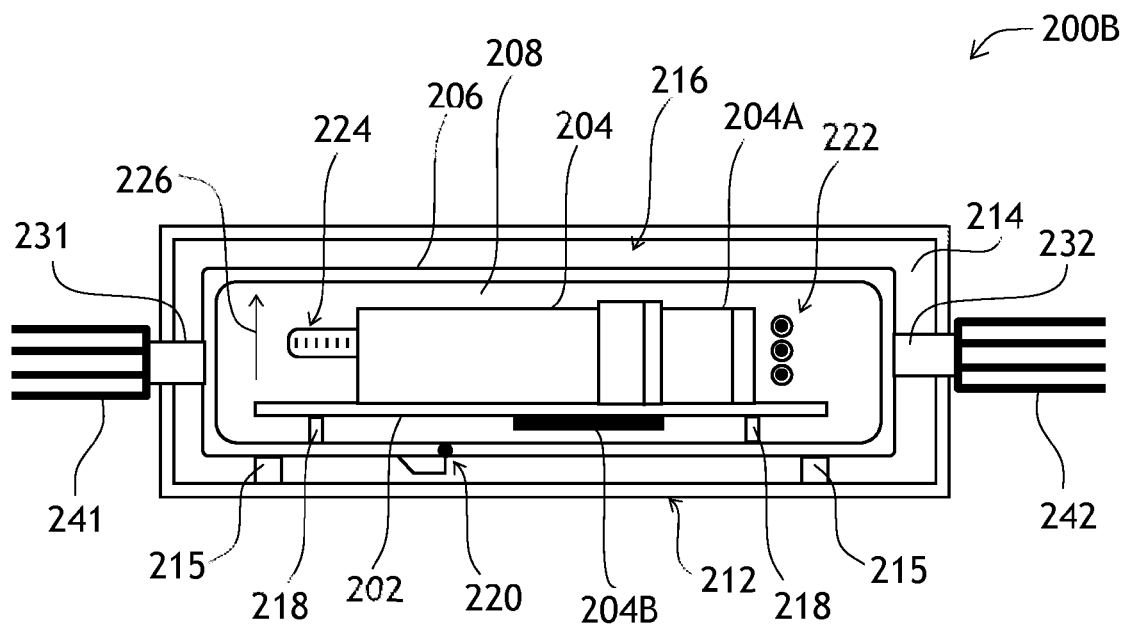
Figure 2C:
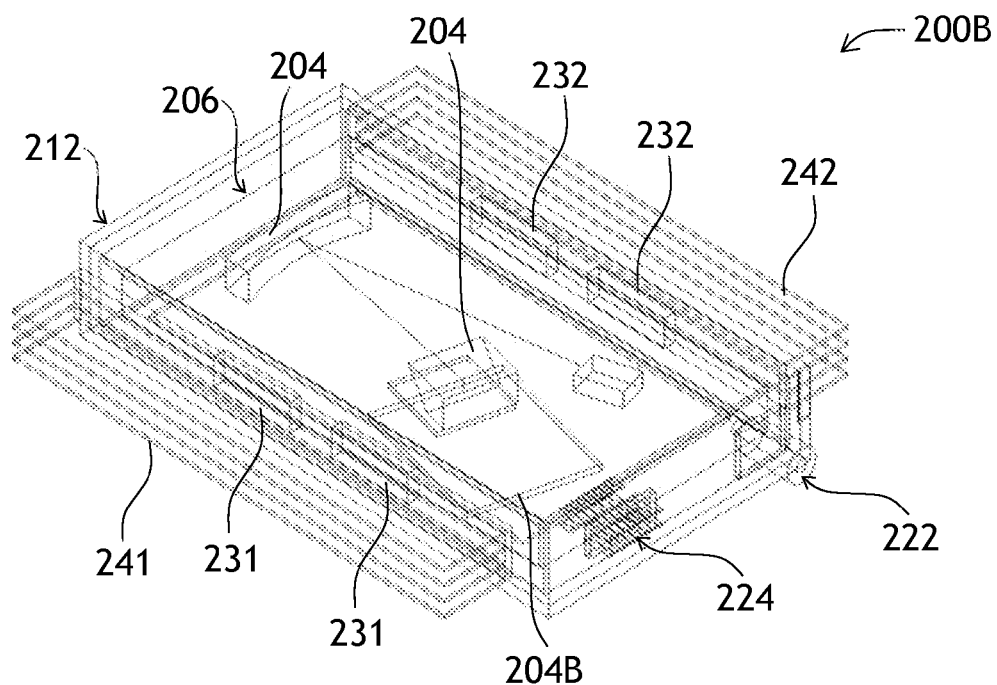
FIG. 2C illustrates an isometric view of the embodiment of FIG. 2B.

Referring now to FIGS. 2B and 2C, an optomechanical assembly 200B is a variant of the optomechanical assembly 200A of FIG. 2A. In FIGS. 2B and 2C, a first thermoelectric cooler 231 is thermally coupled to the inner housing 206 and is partially disposed in the second cavity 214. A first heat sink 241 may be coupled to the first thermoelectric cooler 231 for removing heat generated as a result of cooling the inner housing 206. The optomechanical assembly 200B may also include a second thermoelectric cooler 232 thermally coupled to the inner housing 206 and disposed symmetrically with respect to the first thermoelectric cooler 231. The second thermoelectric cooler 232 may be partially disposed in the second cavity 214, with a second heat sink 242 coupled to the second thermoelectric cooler 232. In some embodiments, the first 231 and second 232 thermoelectric coolers may be attached directly, e.g., soldered, to the inner housing 206. In the embodiment shown in FIG. 2B, the first 231 and second 232 thermoelectric coolers extend from the inner housing 206 and through the second cavity 214 in opposite directions perpendicular to the first direction 226, facilitating reduction of the height of the optomechanical assembly 200B in the first direction 226.

The plurality of optical 222 and electrical 224 ports may extend through the inner housing 206 and into the second cavity 214 perpendicular to the first direction 226. By way of a non-limiting example, thermally matched glass to metal seals may be used for the electrical ports, e.g. pin feedthroughs 224, and metallic (Kovar, copper etc.) pipes brazed onto the Kovar package may be used for optical ports 222 e.g. fiber feed-throughs.

The layered protection against mechanical stress and ambient temperature variation afforded by the optomechanical assemblies 200A of FIG. 2A and 200B of FIGS. 2B and 2C may be very important for wavelength-selective optical modules, such as WSS, wavelength monitors, add/drop multiplexors, etc. For instance, when the temperature of the optical components 204, 204A, 204B is controlled to <1° C., a drift of wavelength channel center wavelength over temperature due to change in the refractive index (n) with temperature (dn/dT) and thermal strain/stress effects may be significantly lessened to a value of less than 8 pm in a typical 50 GHz spaced wavelength channel. This may be a cost-effective way of athermalizing complex WSS optics, compared to providing low dn/dT WSS optics, which tend to be expensive, while differing in CTE from typical optical bench 202 materials by at least 2 ppm/C. By way of a non-limiting example, optomechanical assemblies 200A of FIG. 2A and 200B of FIGS. 2B and 2C may enable the liquid crystal array 204B to remain at a constant operational temperature, regardless of the ambient temperature, for example 55±1° C. when the ambient temperature varies from 0° C. to 70° C.

Figure 3:
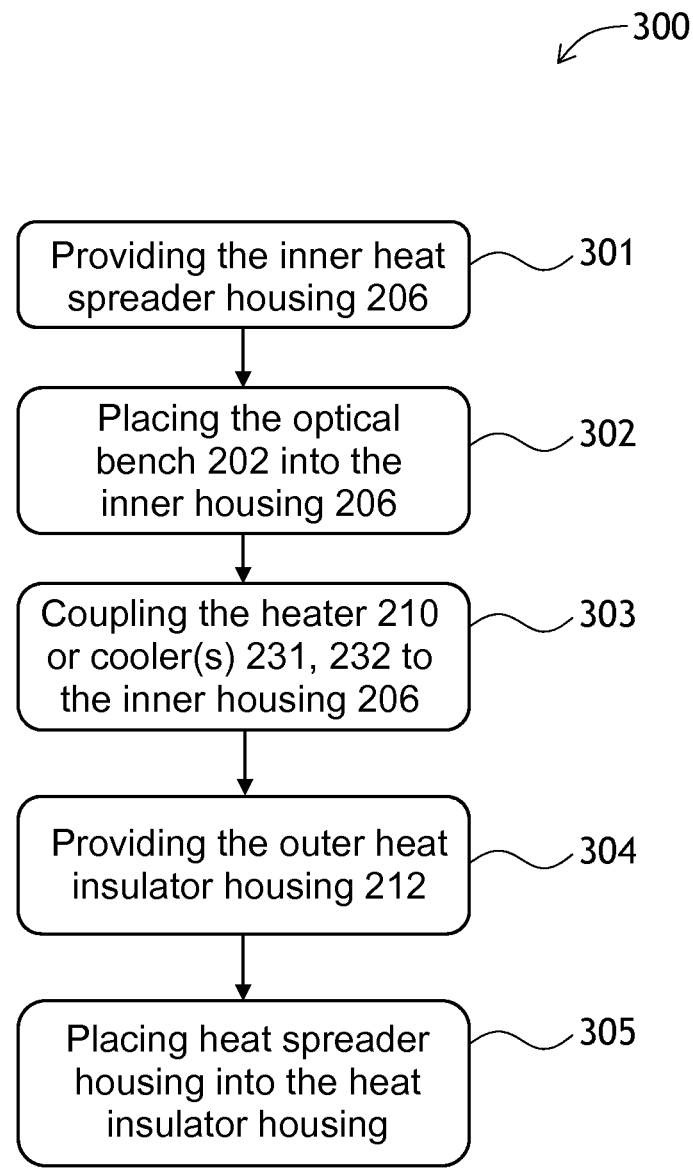
FIG. 3 illustrates a flow chart of one embodiment of a method of packaging an optical bench supporting a plurality of optical components.

Turning now to FIG. 3, a method 300 of packaging the optical bench 202 supporting the plurality of optical components 204, 204A, and 204B may include a step 301 of providing the inner heat spreader housing 206 having the heat conductivity of at least 50 W/m·K and defining the first inner wall 207 and the first cavity 208. In a second step 302, the optical bench 202 may be placed and supported within the first cavity 208. The optical bench 202 may be spaced apart from the first inner wall 207 by the support element(s) 218 for decreasing a mechanical stress and heat transfer to the optical bench 202. In a third step 303, a thermal element, such as the heater 210 or the thermoelectric cooler 231 and/or 232, may be coupled to the inner housing 206 for adjusting temperature of the inner housing 206. In a fourth step 304, the outer heat insulator housing 212, defining the second cavity 214, may be provided. Finally, in a fifth step 310, the inner housing 206 may be supported within the second cavity 214, so that the air gap 216 is provided in the second cavity 214 between the outer 212 and inner 206 housings, the outer housing 212 having a heat conductivity of no greater than 0.4 W/m·K.

It should be appreciated that the support element(s) 218 used in the second step 302 may have an elastic modulus of less than 10 MPa and, optionally, a heat conductivity of less than 2 W/m·K. As explained above, this may facilitate uniform heating of the optical bench 202 and the plurality of optical components 204, 204A, and 204B, while impeding propagation of an external mechanical stress into the optical bench 202 and into the plurality of optical components 204, 204A, and 204B. The second step 302 may also include hermetic sealing of the first cavity 208, with an optional filling the first cavity 208 with an inert gas such as Argon. The inner housing 206 may be extruded, formed or machined, or in some embodiments, hermetically sealed e.g. by soldering, laser welding, seam sealing, or any similar method, but it could also be semi-hermetic and thermally sealed.

In the fourth step 304 of the method 300, the second package 212 may be injection-molded out of a thermoplastic material, or otherwise integral with the leg(s) 215. By way of a non-limiting example, the second package 212 may include two hollow halves or "clam shells", which are snap-fitted together, or slide fit with an overlapping lip to form the second cavity 214. The thermal outer insulation shell may also be an extrusion with two end caps at each end, or variants thereof, etc. The injection molding allows the cost of the optomechanical assembly 200A of FIG. 2A and 200B of FIGS. 2B, 2C to be reduced.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An optomechanical assembly comprising:
   an optical bench;
   a plurality of optical components supported by the optical bench;
   an inner heat-spreader housing defining a wall and a first cavity, wherein
      the inner heat-spreader housing has a heat conductivity of at least 50 W/m·K;
   first support elements mechanically coupled to the inner heat-spreader housing, wherein
      the first support elements contact the wall and extend vertically from the wall and into contact with a portion of the optical bench to isolate the wall from the optical bench,
      the wall being a non-side wall, and
      the first support elements support the optical bench in the first cavity spaced apart from the wall for decreasing a transfer of mechanical stress and heat from outside the first cavity to the optical bench;
   a thermal element thermally coupled to the inner heat-spreader housing for adjusting a temperature thereof; and
   an outer heat-insulator housing for defining a second cavity and supporting the inner heat-spreader housing therein so that an air gap is provided in the second cavity between the inner heat-spreader housing and the outer heat-insulator housing,
      wherein the outer heat-insulator housing has a heat conductivity of 0.4 W/m·K or less, and
      wherein the outer heat-insulator housing supports the inner heat-spreader housing via second support elements extending vertically from an additional wall, a distance between the second support elements being greater than a distance between the first support elements.

2. The optomechanical assembly of claim 1, wherein the first support elements have an elastic modulus of less than 10 MPa.

3. The optomechanical assembly of claim 1, wherein
   the plurality of optical components are thermally matched to the optical bench to within 2 ppm/° C., and
   the optical bench has an elastic modulus of between 70,000 MPa and 320,000 MPa.

4. The optomechanical assembly of claim 1, further comprising:
   a temperature sensor, thermally coupled to the inner heat-spreader housing, for determining the temperature thereof.

5. The optomechanical assembly of claim 1, wherein the thermal element comprises a first thermoelectric cooler partially disposed in the second cavity.

6. The optomechanical assembly of claim 5, wherein
   the plurality of optical components extend from the optical bench in a first direction,
   the thermal element further comprises a second thermoelectric cooler partially disposed in the second cavity, and
   the first and second thermoelectric coolers extend from the inner heat-spreader housing and through the second cavity in opposite directions perpendicular to the first direction.

7. The optomechanical assembly of claim 6, further comprising:
   a plurality of optical and electrical ports extending through the inner heat-spreader housing and into the second cavity perpendicular to the first direction.

8. The optomechanical assembly of claim 1, wherein the plurality of optical components comprise a diffraction grating.

9. The optomechanical assembly of claim 1, wherein the plurality of optical components comprise a liquid crystal array.

10. The optomechanical assembly of claim 1, wherein the plurality of optical components comprise a wavelength-selective optical switch.

11. The optomechanical assembly of claim 1, wherein the inner heat-spreader housing comprises a hermetically sealable package comprising a plurality of optical and electrical ports extending therethrough.

12. The optomechanical assembly of claim 1, wherein the inner heat-spreader housing comprises aluminum or copper.

13. The optomechanical assembly of claim 1, wherein the optical bench comprises Kovar.

14. The optomechanical assembly of claim 1, wherein the outer heat-insulator housing comprises a plastic material.

15. The optomechanical assembly of claim 1, wherein the outer heat-insulator housing comprises an injection-molded shape including a standoff for supporting the inner heat-spreader housing therein.

16. The optomechanical assembly of claim 1, wherein
   the plurality of optical components extend from the optical bench in a first direction;
   the inner heat-spreader housing has an outside perimeter wall extending parallel to the first direction,
   the thermal element comprises a heater extending along the outside perimeter wall, and
   the optomechanical assembly further comprises:
      a temperature sensor, thermally coupled to the inner heat-spreader housing, for determining the temperature thereof.

17. A method of packaging an optical bench supporting a plurality of optical components, the method comprising:
   providing an inner heat-spreader housing having a heat conductivity of at least 50 W/m·K and defining a wall and a first cavity;
   supporting the optical bench, within the first cavity spaced apart from the wall, by first support elements for decreasing a mechanical stress and heat transfer to the optical bench, wherein the first support elements contact the wall and extend vertically from the wall and into contact with a portion of the optical bench to isolate the wall from the optical bench, and wherein the wall is a non-side wall;

thermally coupling a thermal element to the inner heat-spreader housing for adjusting a temperature thereof;

providing an outer heat-insulator housing defining a second cavity; and supporting the inner heat-spreader housing, within the second cavity, so that an air gap is provided in the second cavity between the outer heat-insulator housing and the inner heat-spreader housing, wherein the outer heat-insulator housing has a heat conductivity of no greater than 2 W/m·K, and wherein the outer heat-insulator housing supports the inner heat-spreader housing via second support elements extending vertically from an additional wall, a distance between the second support elements being greater than a distance between the first support elements.

18. The method of claim 17, wherein the first support elements have an elastic modulus of less than 10 MPa.

19. The method of claim 18, further comprising:
hermetically sealing the first cavity.

20. The method of claim 19, further comprising:
injection molding the outer heat-insulator housing out of a plastic material.

* * * * *